United States Patent
Lezock et al.

(10) Patent No.: US 7,992,485 B2
(45) Date of Patent: Aug. 9, 2011

(54) APPARATUS FOR COMPENSATING AND/OR TRANSMITTING FORCES OR TORQUES AND ROTATIONAL MOVEMENTS BETWEEN TWO COMPONENTS

(75) Inventors: Daniel Lezock, Thermalbad Wiesenbad (DE); Wolfgang Freund, Langenberndsdorf (DE); Juergen Schulze, Chemnitz (DE)

(73) Assignee: asturia Automotive Systems AG, Munich (DE)

( * ) Notice: Subject to any disclaimer, the term of this patent is extended or adjusted under 35 U.S.C. 154(b) by 172 days.

(21) Appl. No.: 12/428,882

(22) Filed: Apr. 23, 2009

(65) Prior Publication Data
US 2009/0260514 A1  Oct. 22, 2009

Related U.S. Application Data

(63) Continuation of application No. PCT/DE2006/001894, filed on Oct. 27, 2006.

(30) Foreign Application Priority Data

Oct. 23, 2006 (DE) ............... 20 2006 016 354 U

(51) Int. Cl.
*F15B 15/06* (2006.01)
*B60G 21/055* (2006.01)
(52) U.S. Cl. .................. 92/31; 280/5.511
(58) Field of Classification Search ............ 92/31, 33; 280/5.511
See application file for complete search history.

(56) References Cited

U.S. PATENT DOCUMENTS

| | | | |
|---|---|---|---|
| 3,156,161 A | 11/1964 | Forsman et al. | |
| 4,133,215 A | 1/1979 | Norris et al. | |
| 5,882,017 A | 3/1999 | Carleer | |
| 7,044,048 B2 * | 5/2006 | Ersoy | 92/31 |
| 2005/0167932 A1 | 8/2005 | Munster | |
| 2005/0178927 A1 | 8/2005 | Breuer et al. | |

FOREIGN PATENT DOCUMENTS

| | | | |
|---|---|---|---|
| CA | 2 500 395 A1 | | 4/2004 |
| CA | 2500395 A1 | * | 4/2004 |
| DE | 197 54 539 C2 | | 11/2001 |
| DE | 198 21 209 C2 | | 6/2003 |
| DE | 102 46 457 B3 | | 3/2004 |
| DE | 10 2004 004 335 A1 | | 8/2005 |
| FR | 2 406 247 | | 5/1979 |
| JP | 5-319063 A | | 3/1993 |
| WO | WO 03/072955 A1 | | 9/2003 |

OTHER PUBLICATIONS

International Search Report dated Sep. 25, 2007 (Five (5) pages).

* cited by examiner

*Primary Examiner* — Thomas E Lazo
(74) *Attorney, Agent, or Firm* — Crowell & Moring LLP

(57) ABSTRACT

An apparatus for compensating and/or transmitting forces/torques and rotational movements between two components, particularly for compensating for vehicle movements, in which at least one joint module is situated between the two components, which joint module converts a translational and/or rotational movement of a piston, to which a pressure medium is applied, into a rotational movement of at least one first rotatable shaft or of a first and a second rotatable shaft.

28 Claims, 8 Drawing Sheets

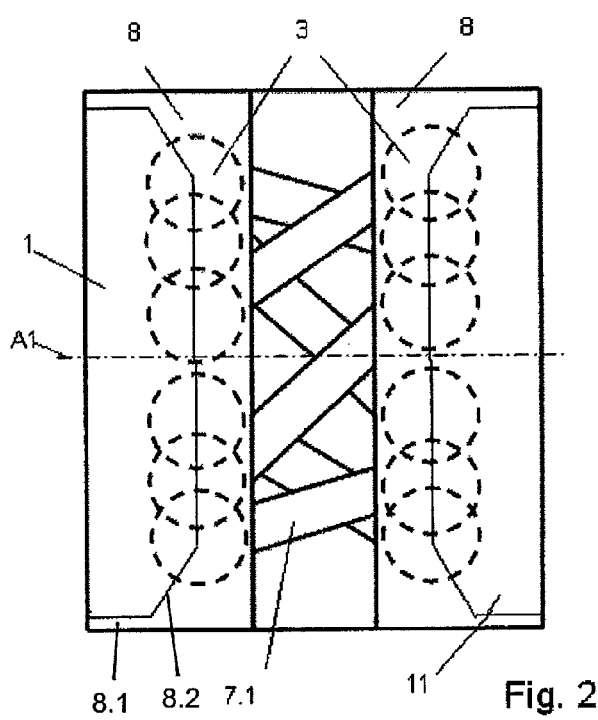
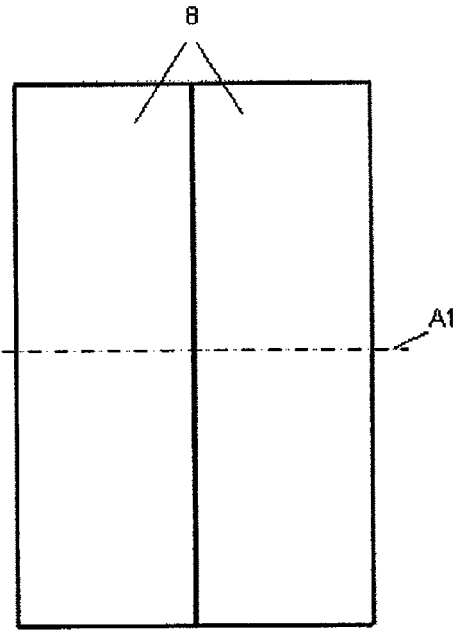
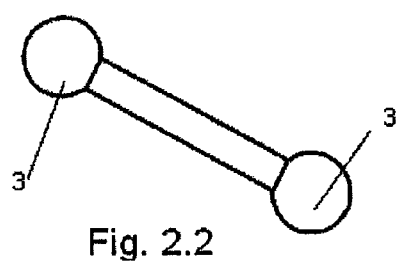
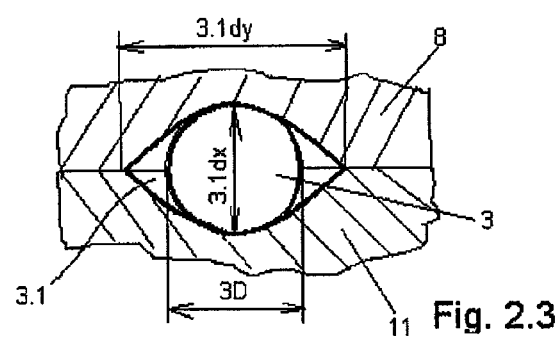
Fig. 2    Fig. 2.1    Fig. 2.2    Fig. 2.3

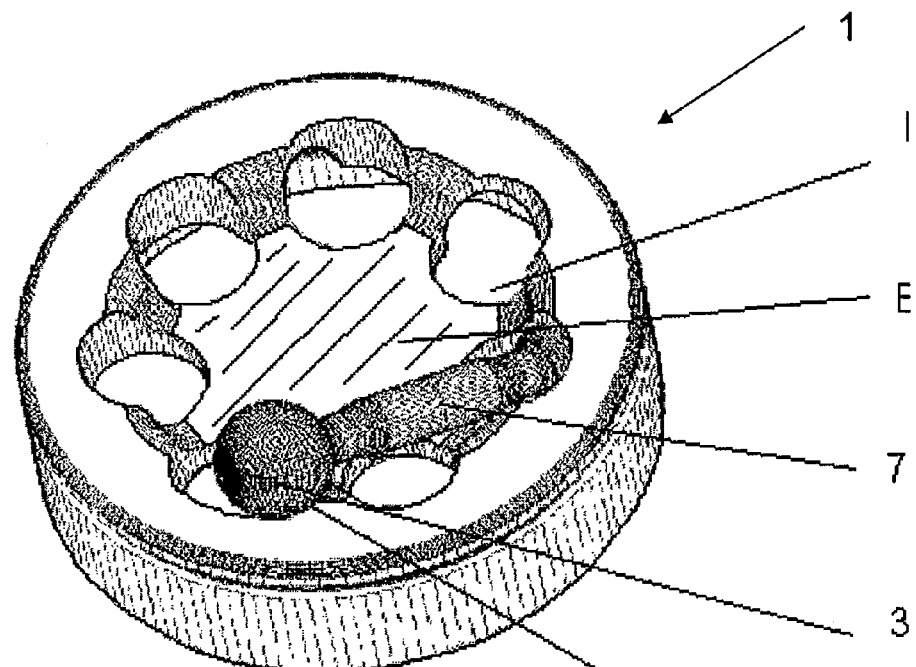
Fig. 3.1
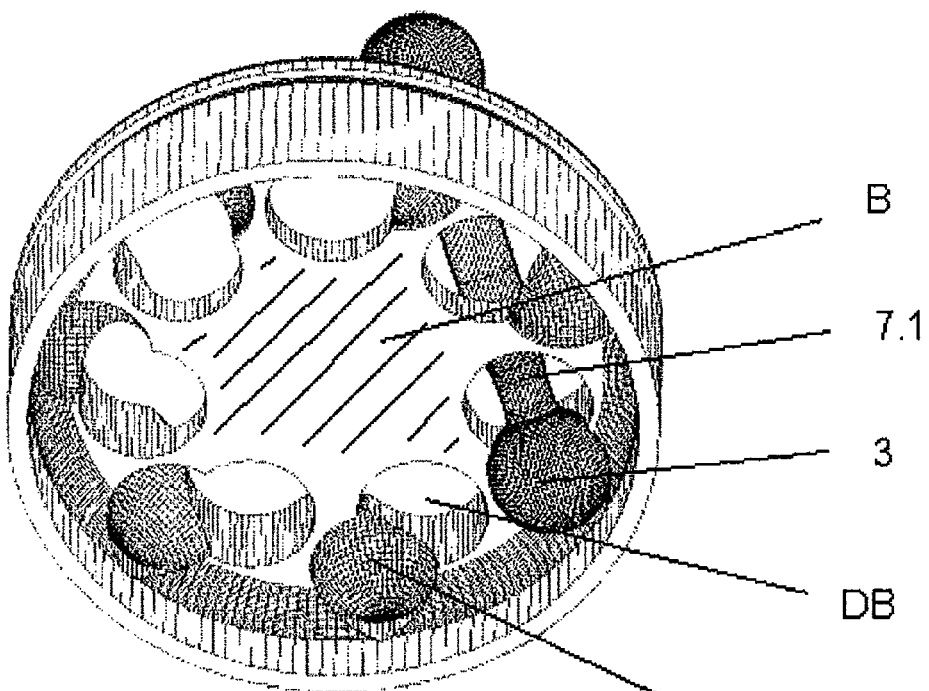
Fig. 4.1

_US 7,992,485 B2_

APPARATUS FOR COMPENSATING AND/OR TRANSMITTING FORCES OR TORQUES AND ROTATIONAL MOVEMENTS BETWEEN TWO COMPONENTS

CROSS REFERENCE TO RELATED APPLICATIONS

This application is a continuation of international patent application no. PCT/DE2006/001894, filed Oct. 27, 2006, designating the United States of America, and published in German on May 2, 2008 as WO 2008/049382, the entire disclosure of which is incorporated herein by reference. Priority is claimed based on Federal Republic of Germany patent application no. DE 20 2006 016 354.9, filed Oct. 23, 2006.

BACKGROUND OF THE INVENTION

The invention relates to an apparatus for the compensation and/or transmission of forces/torques and rotational movements between two components, and is used in particular for the compensation of vehicle movements, e.g., in an active chassis of a motor vehicle in order to stabilize the suspension.

A linear pivot drive, in particular for the flap control of aerodynamic structures, is known from US 2005/525516 (=WO 03/072955). It comprises a housing, in which a piston is situated so it is axially displaceable by application of a pressure medium. A driveshaft works together with the piston via a thread. A rotational movement is transmitted to the driveshaft by the axial movement of the piston through the thread. The large frictional forces which act through the thread are a disadvantage. Furthermore, it is a disadvantage that the output shaft comprises two partial sections, to which a torque is applied in the same rotational direction. It is not possible with this arrangement to transmit different and even opposing torques onto the two shaft sections. This arrangement is therefore not suitable for compensating forces and torques between two components.

A vehicle suspension having a roll stabilizer without the use of a piston is described in U.S. Pat. No. 5,882,017 (=DE 198 21 209). This vehicle suspension has a rod-shaped stabilizer, which is connected to the vehicle, and two connecting rods, which connect the stabilizer to the wheels. The rotational movement may be restricted by two limiters, which can be actuated alternately. A torsion force is generated by a central section. The use of the two limiters requires a large installation space and is relatively complex.

A chassis configuration for a vehicle is described in US 2005/167932 (=DE 10 2004 004 335 A1), in which the actuator for pivoting the stabilizer halves has separate drive units, which are realized in the form of electric motors. It is a disadvantage that these actuators have a complex gearing.

A stabilizer having two pistons, to which pressure medium can be applied, and a ball screw is disclosed in JP 5-319063 A. It also has a complex design.

DE 197 54 539 C2 describes a pivot motor, which is situated in a divided vehicle axle and has a cylinder having radial ribs on the interior side of the cylinder. Furthermore, a motor shaft having vanes is situated in the cylinder. The ribs and the vanes form operating chambers, to which a hydraulic pressure can be applied, whereby the motor shaft is caused to rotate relative to the housing. One end of the housing is fixedly connected to a part of the vehicle axle and the other end is constructed as a rotatable shaft and is connected to the other part of the vehicle axle, so that vehicle movements may be compensated for by a rotational movement of the rotatable shaft and the accompanying twisting of the two parts of the vehicle axle.

Furthermore, arrangements for actuating valves and slides are known, in which a travel distance is generated by converting a rotating movement into linear movement by coupling rods, which are situated in a housing and are mounted on one side on the housing and a piston or between two pistons. The housing is not fastened to a component and in general only a rotatable shaft output is provided. FR 2,406,247 describes an arrangement in which a linear movement is converted into a nonlinear movement using coupling rods in connection with pistons.

A further arrangement is disclosed in U.S. Pat. No. 4,133,215. This also relates to an apparatus for converting linear and rotating movements and is used as a drive and actuating unit for a 90°-rotating valve, such as a valve having a shutoff body (cone or ball valve). The arrangement described in U.S. Pat. No. 3,156,161 also relates to the use in valves. The use of valves or cocks which are opened or closed at relatively large intervals, and the compensation of chassis movements and reduction of vehicle oscillations, which require a significantly greater frequency at corresponding travel distances, are not comparable to one another in this case.

An apparatus of the foregoing general type in the form of a pivot motor for chassis stabilization in an active chassis is disclosed in CA 2,500,395 (=DE 102 45 457). The pivot motor is typically situated in a divided axle (stabilizer) and one side of the housing is connected fixed to the axle. A rotatable shaft, which is connected to the axle, projects through the other side of the housing. An axially movable piston and pressure medium connections are provided in the housing, which extend to pressure chambers in front of and behind the piston. The rotatable shaft can be set into rotation by an axial movement of the piston, so that both parts of the axle may be turned in relation to one another. The conversion of the axial movement of the piston into a rotational movement of the rotatable shaft is carried out by ball rods, which are secured to the piston and to the housing. The relatively large installation space and the still somewhat complex construction are disadvantageous. Furthermore, this arrangement only has one shaft output, which limits its potential field of use.

SUMMARY OF THE INVENTION

The object of the invention was to provide an improved apparatus for the compensation and/or transmission of forces/torques and rotational movements between two components.

Another object of the invention was to provide an apparatus for the compensation and/or transmission of forces/torques and rotational movements between two components which is particularly suited for compensating vehicle movements.

A further object of the invention is to provide an apparatus for the compensation and/or transmission of forces/torques and rotational movements between two components which has a simple construction and can be manufactured without undue effort or expense.

An additional object of the invention is to provide an apparatus for the compensation and/or transmission of forces/torques and rotational movements which is flexible in application and can be used in a variety of different ways.

These and other objects have been achieved by the present invention and described and claimed hereinafter.

The apparatus according to the invention is a device for the compensation and/or transmission of forces/torques and rotational movements between two components, in particular for the compensation of vehicle movements, which comprises at least one joint module situated between the two components, by which a translational and/or rotational movement of a piston, to which a pressure medium is applied, can be converted into a rotational movement of at least one first rotatable shaft or of a first and a second rotatable shaft.

Because one or two rotatable shafts are alternately usable, the apparatus may surprisingly be used in a variety of different ways for compensation of vehicle movements.

Furthermore, it is possible for the first time to couple multiple joint modules to one another, by which the possible pivot angle may be significantly increased in comparison to conventional arrangements. Each joint module may be situated in a separate housing or multiple joint modules may be situated in a shared housing. If multiple joint modules are used, they may be situated so they are axially adjustable and/or movable relative to one another, whereby it is possible to generate or absorb and/or compensate for axial movements and/or axial forces.

Furthermore, it is possible to arrange two joint modules so that they are pivotable relative to one another.

The joint module for compensating vehicle movements comprises a housing, in which a piston is situated, as well as a first shaft output in the form of a first rotatable shaft, which can be caused to rotate as a function of the vehicle movements and is operationally linked to the piston via first coupling elements, which are mounted so they are rotationally movable on both ends, and with pressure chambers situated on both sides of the piston.

Furthermore, the joint modules may each contain one or more of the following feature groups:

a) a pressure medium line leading through the housing in the axial direction of the pivot motor to one or both pressure chambers,
and/or
b) the coupling elements having balls on their ends and being fixed in ball sockets on the piston side and/or on the rotatable shaft side and/or in the direction of an end cover of the housing using a fastening ring in each case, the fastening ring having openings through which the balls of the coupling elements can be guided,
and/or
c) the coupling elements having balls on their ends, the balls being fixed in ball joints on the piston side and/or on the rotatable shaft side and/or in the direction of an end cover of the housing using a fastening ring in each case, the fastening ring being materially bonded or welded on the piston side and/or on the rotatable shaft side and/or in the direction of an end cover of the housing in the axial direction of the pivot motor,
and/or
d) the coupling elements having balls on their ends which are fixed on the piston side and/or on the rotatable shaft side in ball sockets, the ball sockets expanding in the radial direction to a diameter which is greater than the diameter of the balls, and wherein the socket pole spacing of the ball sockets is equal to the diameter of the balls,
and/or
e) the piston having a third pressure chamber, which is connected to the first pressure chamber, and a fourth pressure chamber, which is connected to the second pressure chamber,
and/or
f) on the side of the piston opposite from the first rotatable shaft, there is a second shaft output in the form of a second rotatable shaft, which is operationally linked to the piston via second coupling elements, which are mounted so they are rotationally movable on both ends.

The piston is mounted so it is axially movable and rotationally movable, with a first pressure chamber situated between the first rotatable shaft and the piston, and a first pressure medium line leading to the first pressure chamber. On the other side of the piston, a second pressure chamber is situated, to which the second pressure medium line leads. Depending on the design embodiment of the joint module, the second pressure chamber is constructed between the piston and a housing-side cover (joint module having one rotatable shaft) or between the piston and a second rotatable shaft (joint module having two rotatable shafts). The first pressure medium line, which is connected to the first pressure chamber, and the second pressure medium line, which is connected to the second pressure chamber, preferably lead through housing covers situated on both sides of the housing in the direction of the longitudinal axis of the joint module.

The installation space of the joint module may be significantly decreased or its performance may be increased with the same installation space through this axial pressure medium feed.

Alternatively, it is possible to extend the first pressure medium line, which is connected to the first pressure chamber, and the second pressure medium line, which is connected to the second pressure chamber, through the housing in the radial direction via connections fastened on the housing.

The coupling elements are preferably constructed as ball rods with their balls fixed in ball sockets using fastening rings as previously described. The coupling elements constructed as ball rods are both fixed on the rotatable shaft side and/or cover side using the balls at their ends in ball sockets of a socket ring which is fastened on the rotatable shaft side and/or the cover side, and fixed in ball sockets of the piston using fastening rings. In order to assure proper securing of the ball rods, the fastening elements are provided with corresponding openings.

The fastening rings are constructed with slots extending radially inwardly or outwardly for guiding through the balls. For this purpose, the fastening rings have a base, in which concavely curved recesses are situated to form the ball sockets. Furthermore, the base has a central opening, from which the slots lead to the concavely curved recesses. The width of the slots must be greater than the diameter of the rods which connect the balls of the ball rods.

Alternatively, the fastening rings may have a base in which concavely curved recesses are situated to form the ball sockets, each recess having an associated hole, which is offset in the radial direction and/or in the peripheral direction, and which leads to the recess and has a diameter that is greater than the ball diameter. The balls of a ball rod to be mounted are guided through the hole from the side opposite the ball socket and then placed in the ball socket.

Preferably, one respective fastening ring is materially bonded to the piston and another respective fastening ring is materially bonded to the ball socket ring. In particular, this may be effected by welding. The weld seam preferably runs axially and is closed around the circumference. For this purpose, the fastening ring is welded to the ball socket ring and/or to the piston via a weld seam running in the axial direction. This has the advantage that it is possible to compensate for tolerances between the components to be joined and to avoid shrinkage tensions. For this purpose, the fastening rings each have an edge which overlaps the piston or the socket ring around the circumference in the axial direction. The edge of a fastening ring and the adjoining area of the piston and/or the socket ring are preferably axially welded to one another (e.g., using laser welding). Undesired tensions in the area of the ball sockets are avoided by this welding procedure, which is performed with an axial weld seam spaced a distance from the ball sockets.

Of course, a radial weld seam or another material bond (solder or adhesive bond) may also be used.

Because the ball sockets expand in the radial direction to a diameter which is greater than the diameter of the balls and the socket pole spacing of the ball sockets is equal to the diameter of the balls, considerable significance is attributed to mounting of the balls in the ball sockets without strain or tension.

If the piston has a third pressure chamber, which is connected to the first pressure chamber, and a fourth pressure chamber, which is connected to the second pressure chamber, the effective piston surface and thus the performance of the joint module may thus be significantly increased. For this purpose, the piston is constructed as H-shaped viewed in longitudinal section, i.e., it has a reduced diameter in its middle area, which is adjoined by third and fourth additional piston surfaces, the third and the fourth pressure chambers being located in a cavity between the housing, the reduced diameter, and the third and fourth piston surfaces of the piston, and being separated from one another by a partition wall.

The first pressure chamber is connected via a first connection line to the third pressure chamber, which is located on the side of the partition wall facing away from the first pressure chamber. There is also a connection between the second pressure chamber via a second connection line to the fourth pressure chamber, which is located on the side of the partition wall facing away from the second pressure chamber. The partition wall presses against both the housing and also the reduced diameter of the H-shaped piston, and seals the third and fourth pressure chambers relative to one another. The partition wall is preferably situated fixed on the frame on the housing.

If the joint module has a first and a second rotatable shaft, the first rotatable shaft situated on one side of the piston and the first coupling elements, and the second rotatable shaft situated on the other side of the piston and the second coupling elements, are preferably arranged in a mirror image relation on opposite sides of the central axis of the piston (in the event of a central position of the piston), with the central axis of the piston extending perpendicularly to the longitudinal axes of the rotatable shafts.

However, it is also possible to arrange the first coupling elements, which are situated on one side of the piston, offset to the second coupling elements, which are situated on the other side of the piston, around the circumference, so that one ball of the second coupling elements is fastened on the piston between two of the respective balls of the first coupling elements and vice versa.

By application of pressure to the first pressure chamber and/or the second pressure chamber, the piston moves in the direction of the pressure chamber having the lower pressure, whereby the first rotatable shaft and the second rotatable shaft are caused to rotate in opposite directions and roll movements of the vehicle may be compensated for.

If both pressure medium lines are closed, both rotatable shafts are rigidly coupled to one another.

If the pressure chambers are relieved of pressure, both rotatable shafts are decoupled and are pivotable independently of one another.

Each rotatable shaft is supported via an axial thrust bearing on a housing end cover.

Furthermore, grooves for accommodating guide rings may be arranged on the outer circumference of the fastening rings. A seal is situated in each case between the pressure chambers and the thrust bearing.

To ensure proper mounting and to simplify the manufacturing process, the piston is divided into two halves perpendicularly to the longitudinal axis of the rotatable shafts. Both halves of the piston may be mounted centered to one another using a centering ring, with a projection of one half of the piston engaging in a recess of the adjoining half of the piston to fix it in position.

Alternatively, the two piston halves may be provided with shaped elements which center one another, and which engage in one another. Both piston halves are materially bonded to one another, in particular welded (e.g., using laser welding). The housing covers are also preferably welded to the housing.

The joint module is situated in a stabilizer, for example, which is connected to the chassis. The first rotatable shaft is connected to a first half of the stabilizer and the opposing housing cover and/or the housing or the second rotatable shaft is connected to the second half of the stabilizer.

If only one rotatable shaft is used, inclinations of the vehicle may already be compensated for by its pivot movement. This embodiment may be associated directly with a wheel, for example, and absorb the wheel movements.

If two rotatable shafts are used, greater angles of inclination of the vehicle may be compensated for by opposing rotational or pivot movements of the two rotatable shafts. If pressure is applied to one pressure chamber and the other pressure chamber is relieved of pressure, the piston moves toward the pressure chamber relieved of pressure, whereby opposing pivot movements are executed via the coupling elements of both rotatable shafts.

If both pressure chambers are unpressurized, both rotatable shafts are decoupled and are pivotable independently of one another, the piston moving axially and executing a rotational movement. If the pressure medium lines are closed, both rotatable shafts are rigidly coupled to one another, so that the stabilizer acts like a one-piece element, the piston being stationary.

Thus, an apparatus for the compensation and/or transmission of forces/torques and rotational movements between two components is provided by the arrangement according to the invention, which is particularly useful for the compensation of vehicle movements and is usable in a variety of ways and has a simple design and requires little installation space

BRIEF DESCRIPTION OF THE DRAWINGS

The invention will be explained in greater detail hereafter with reference to illustrative embodiments shown in the accompanying drawing figures, in which:

FIG. 2: shows a detail from FIG. 1 having separated fastening rings;

FIG. 2.1: shows a detail from FIG. 1 having fastening rings pressing against one another;

FIG. 2.2: shows a ball rod coupling element;

FIG. 2.3: shows a cross-section through a ball socket having a ball located therein;

FIG. 3.1: shows a piston having a base and receptacles for coupling elements;

FIG. 4.1: shows a fastening ring having a base and receptacles for coupling elements;

DESCRIPTION OF PREFERRED EMBODIMENTS

Figure 1:
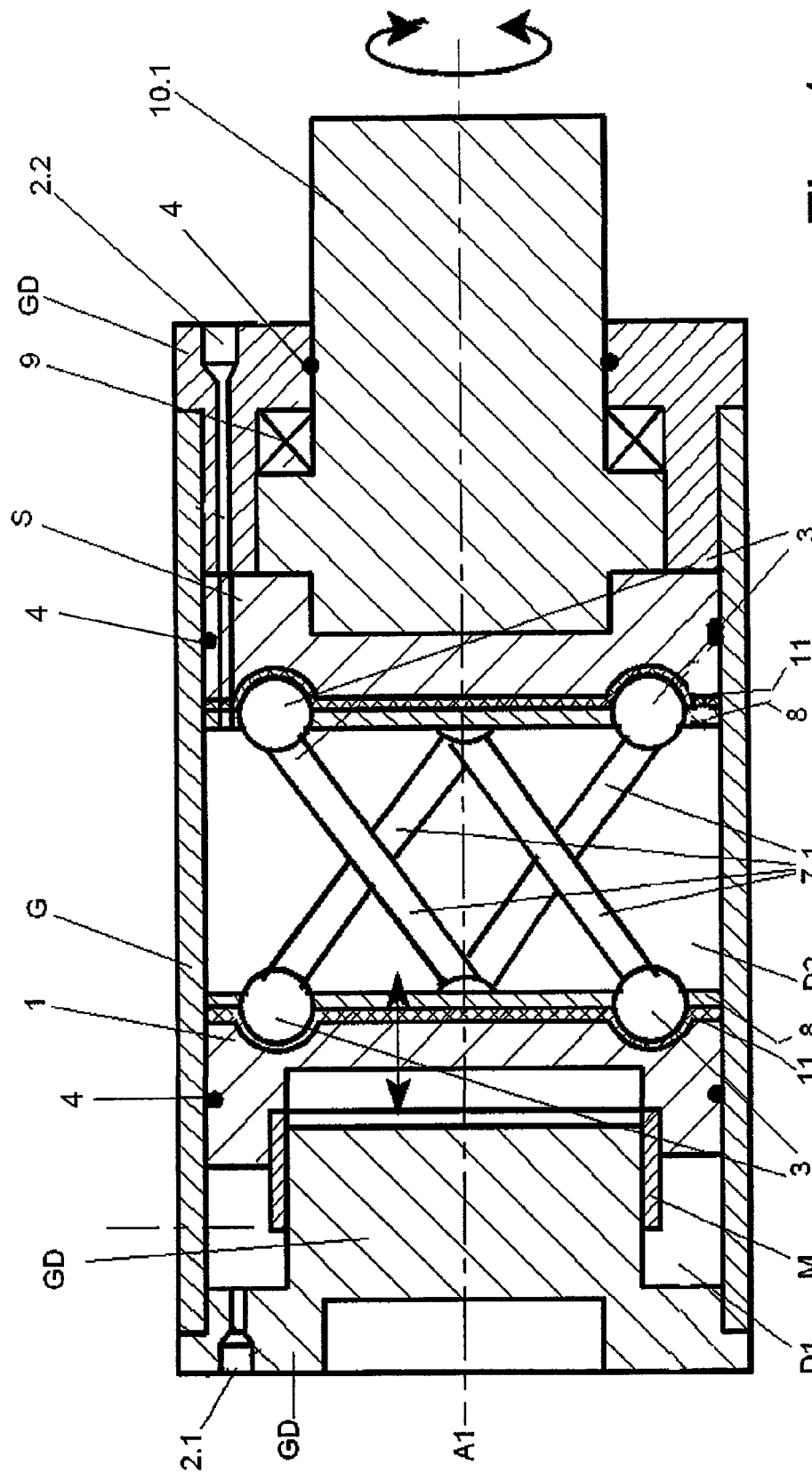
FIG. 1: shows a schematic illustration of a joint module having one rotatable shaft and an axial pressure medium feed.

FIG. 1 shows the schematic illustration of a joint module comprising a rotatable shaft 10.1 and axial pressure medium feeds 2.1, 2.2 in the starting position. A piston 1 is situated in a housing G and which is mounted via a spline-toothed sliding sleeve M so that the piston is rotationally fixed and axially displaceable. The sliding sleeve M is seated on a projection GD', which extends in the direction toward the piston, of the housing cover GD, which closes the housing G on the left side of the figure. A first pressure chamber D1, to which the first pressure medium feed line 2.1 leads, is formed between piston 1 and housing cover GD.

The balls 3 at one end of four ball rods (first coupling elements 7.1) are pivotably mounted in ball sockets (not shown in greater detail) on the side of the piston 1 facing away from the housing cover GD via a fastening ring 8 and a piston-side socket ring 11. The balls 3 at the opposite ends of the ball rods (first coupling elements 7.1) are also pivotably mounted in ball sockets of a second fastening ring 8 and a socket ring 11 on the rotatable shaft side. The balls 3 and the ball sockets of the fastening rings 8 and the socket rings 11 thus form ball-and-socket joints.

A second pressure chamber D2 having a pressure medium feed line 2.2 is formed between the two fastening rings 8. The fastening ring 8, which is remote from the piston 1, and the associated socket ring 11 are connected via an adapter S to a first rotatable shaft 10.1, which is supported via an axial thrust bearing 9 on the other housing cover GD and is mounted so it is rotatable in the housing G. This first rotatable shaft 10.1 projects through the housing cover GD. The four ball rods (coupling elements 7.1) are all inclined at the same angle and are situated at equal intervals on a common pitch circle. The housing covers GD are welded tightly to the housing G. The piston 1 and the adapter S are sealed to the inner wall of the housing G, and the housing cover GD on the rotatable shaft side is sealed to the external diameter of the rotatable shaft 10.1 by seals.

The mode of operation is as follows:

Upon application of pressure through the first hydraulic connection (pressure medium feed 2.1) to the cylindrical piston 1, the piston, which is locked against rotation by the spline-toothed sliding sleeve M, is displaced toward the first rotatable shaft 10.1. The piston force is transmitted via the ball rods (coupling elements 7.1) to the fastening rings 8 and the socket rings 11. As a result of the spatial inclination of the four coupling elements 7, both an axial force component and a circumferential force component are generated in the socket rings 11, with the result that the four coupling elements 7.1 incline further and further. The circumferential force component causes the desired rotational force on the first rotatable shaft via the adapter S, with the magnitude of the force being a function of the piston force and the ball rod spatial angle. The axial component is compensated for by the thrust bearing 9.

Rotation in the opposite direction is caused by the application of pressure through the hydraulic connection 2.2 to pressure chamber D2. The operating angle of the coupling elements 7.2 becomes greater again. The housing G is designed with the piston-side housing cover GD as the counter bearing (solid bearing) to the first rotatable shaft 10.1, so that the torque in the joint module is produced between housing G and the rotatable shaft 10.1.

Figure 1A:
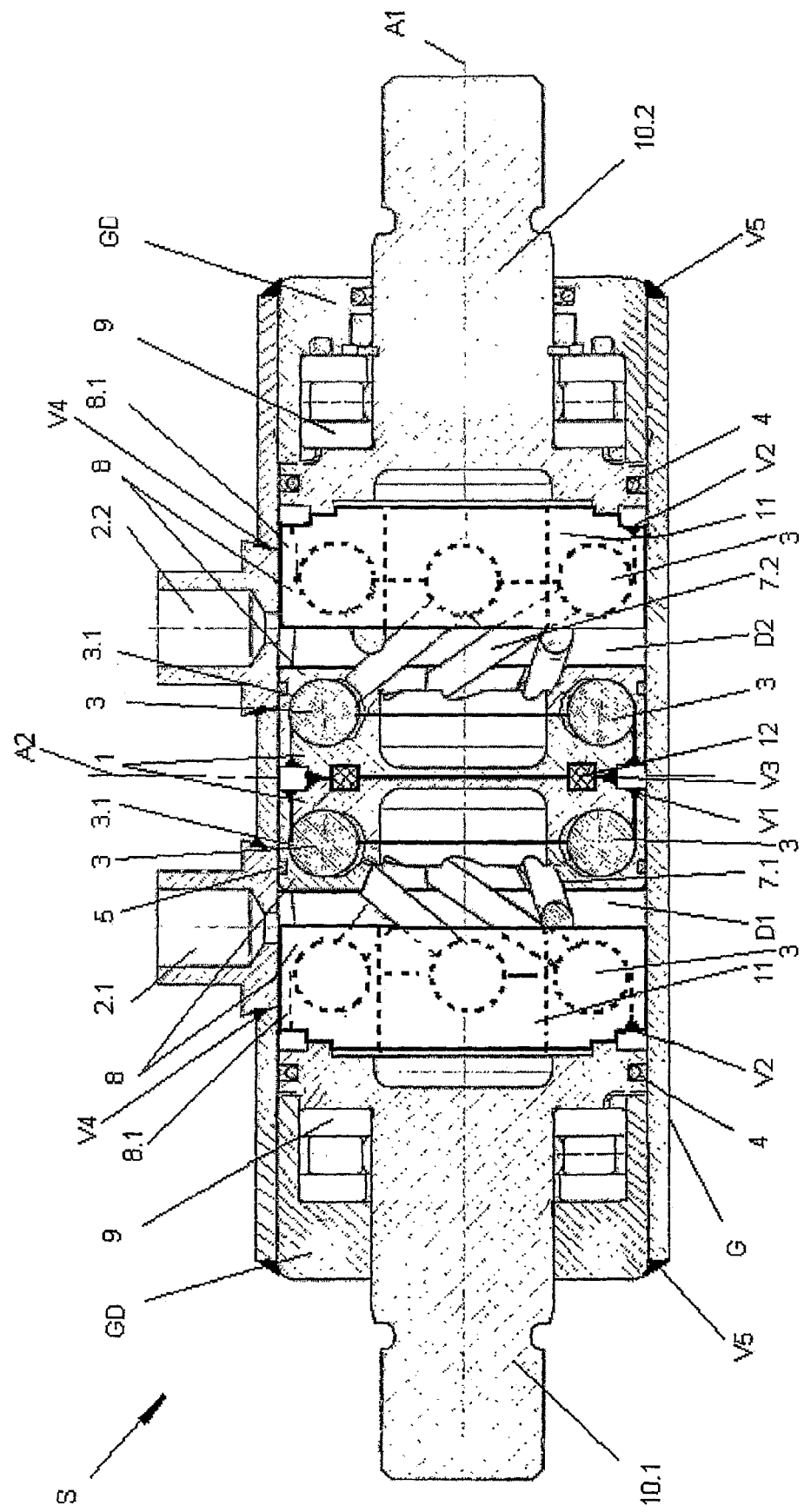
FIG. 1a: shows the construction of a joint module S having two rotatable shafts and having a radial pressure medium feed.

FIG. 1a shows a longitudinal section view of a joint module constructed in a symmetrical or mirror image arrangement, comprising two rotatable shafts 10.1, 10.2 and two radial pressure medium feeds 2.1, 2.2. The piston 1 (shown here in a central position, is disposed in the housing G and is operatively linked via coupling elements 7.1 and 7.2 in the form of ball rods, to the rotatable shafts 10.1 and 10.2, which are arranged on both sides of the piston 1 and are rotatable around a longitudinal axis Al. The ball rods (coupling elements 7.1, 7.2) are fastened both to the piston 1 and also to the rotatable shafts 10.1, 10.2 via connections such as ball-and-socket joints using the balls 3 disposed at their ends and are secured using fastening rings 8.

A first pressure chamber DI is formed between the piston 1 and the first rotatable shaft 10.1, and a second pressure chamber D2 is formed between the piston I and the second rotatable shaft 10.2. A first pressure medium feed 2.1 leads radially through the housing G to the first pressure chamber D1, and a second pressure medium feed 2.2 leads in the radial direction to the second pressure chamber D2. Each rotatable shaft 10.1, 10.2 is supported by an axial thrust bearing 9 on a respective housing end cover GD. A seal 4 is provided in each case between the thrust bearing 9 and the pressure chambers DI and D2. An opposing pivot movement of the rotatable shafts 10.1 and 10.2 is generated by movement of the piston 1 by application of pressure to the pressure chambers D1 and/or D2.

The coupling elements 7.1 and 7.2, which are constructed as ball rods, are fixed using the balls 3 at their ends in the fastening rings 8, which partially enclose them, in such a way that the fastening rings 8 may press against one another without a gap ("in a block") (FIG. 2.1). This simplifies the mounting of the joint module.

FIGS. 2 and 2.1 show a schematic illustration of the ball and socket connection, which is associated with the rotatable shaft 10.1, with only piston 1 and socket ring 11 being depicted. A corresponding connection associated with the rotatable shaft 10.2 is disposed in mirror image relation on the opposite side of the central axis A2 of the piston 1 which extends orthogonally to the longitudinal axis A1.

In the example shown in FIG. 1a, the first rotatable shaft 10.1 and first coupling elements 7.1, which are situated on one side of the piston 1, and the second rotatable shaft 10.2 and second coupling elements 7.2, which are situated on the other side of the piston 1, are preferably attached in a mirror image arrangement on opposite sides of the centrally disposed piston 1. However, it is also possible to situate the first coupling elements 7.1, which are located on one side of the piston 1, offset around the circumference from the second coupling elements 7.2, which are located on the other side of the piston 1, whereby tolerance compensation is provided (not shown). Thus, for example, three first coupling elements 7.1 and, for example, three second coupling elements 7.2 may be arranged in mirror image relation as shown in FIG. 1a or alternatively offset in relation to one another around the circumference (not shown). In addition, the coupling elements 7.1, 7.2 assume a spatial angle, so that, with a mirror-image construction, a nearly constant torque curve over the rotational angle and thus a more uniform force curve result.

The fastening rings 8 are connected in the axial direction, i.e., in the direction of the longitudinal axis A1 of the rotatable shafts 10.1, 10.2, either to the piston 1, in which the balls 3 at one end of each of the coupling elements 7.1, 7.2 are received, using a first axial weld seam V1 or to the counterpart of the piston 1, socket ring 11 in which the balls 3 at the opposite ends of the ball rods are received, using a second axial weld seam V2, preferably by electron beam welding. For this purpose, the fastening ring 8 has an edge 8.1, which overlaps the socket ring 11 and on which the weld seam V2 is attached in the axial direction. On the other side, a peripheral edge 8.1 of a further fastening ring 8 overlaps the piston 1, to which it is also connected via an axial weld seam V1. The attachment of the weld seams V1, V2 in the axial direction—i.e., in the direction of the longitudinal axis A1—has the advantage that no clamping of the balls 3 occurs. However, it is also possible to use of other welding methods or other materially-bonded connections.

In addition, it may be seen in FIG. 2 that the fastening ring 8 and the socket ring 11 have a wedge-shaped bevel radially outward in the direction of the housing G, which transitions into the overlapping edge 8.1 on the fastening ring 8. Greater forces are also possible because of the increased enclosure angle of the balls 3 which results from this bevel.

To make it easier to mount the coupling elements 7.1, 7.2, the fastening rings 8 are slotted in a radially outward or radially inward direction. In addition, the fastening rings 8 have ball sockets 3.1, which are provided for receiving the balls 3 of the coupling elements 7.1, 7.2. The piston 1 and the socket ring 11 also have corresponding ball sockets 3.1 for accommodating the balls 3.

The coupling elements 7.1, 7.2, which are constructed as ball rods (FIG. 2.2), are preferably produced in one piece in a reshaping method with or without pole flattening.

Figure 3:
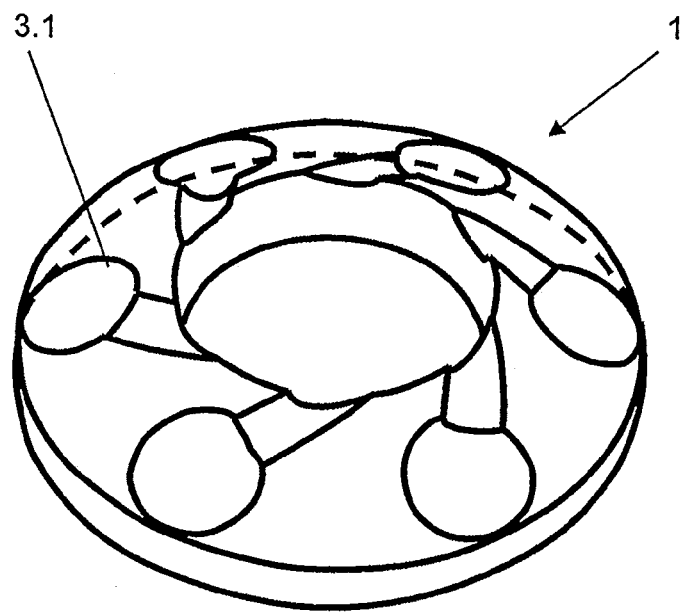
FIG. 3: shows a piston having receptacles for coupling elements.

FIG. 3 shows the part of the piston 1 with the ball sockets 3.1, which accommodate the coupling elements 7.1, 7.2.

Figure 4:
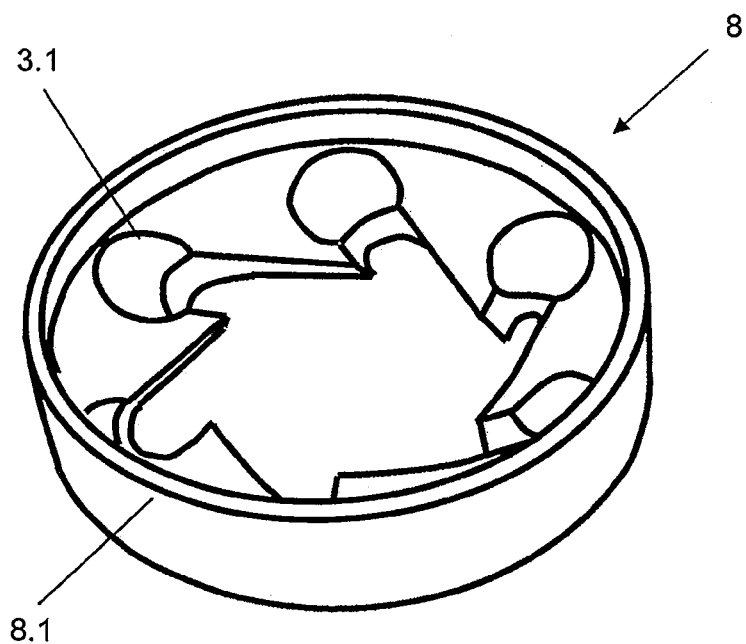
FIG. 4: shows a fastening ring having receptacles for coupling elements.

FIG. 4 shows a fastening ring 8 having the ball sockets 3.1 and the raised edge 8.1, which encloses the piston 1 and/or the socket ring 11 and is materially bonded thereto-using weld seam V1 or V2, respectively. The diameter of the ball socket 3.1 in which the balls 3 are received is greater than the diameter of the balls 3, however, the spacing of the socket poles to one another is equal to the diameter of the balls 3 of the coupling elements 7.1 and 7.2.

While the piston I and fastening ring 8 shown in FIGS. 3 and 4 are constructed without bases, the piston 1 and fastening ring 8 shown in FIG. 3.1 and FIG. 4.1 each have—similar to the socket ring 11—a base B having openings DB. The coupling elements 7.1 and 7.2 extend through these openings DB and are accommodated with the balls 3 at their ends received in the ball sockets 3.1 located there. This compact embodiment of the piston 1, the fastening ring 8, and the socket ring 11 provides greater functional reliability and greater rigidity in comparison to the embodiment without a base described above. In addition, the production and assembly are simplified by this arrangement.

The thrust bearing 9 (FIG. 1a) is configured so that one thrust bearing contact surface presses against the shaft collar and the other presses against the housing cover GD, so that the thrust bearing 9 is subjected to loading in the same direction during both left-hand and right-hand rotation of the rotatable shafts 10.1 and 10.2. As a result of the application of pressure, transverse forces can be absorbed. The rotatable shafts 10.1, 10.2 are thus stabilized. A seal 4 is provided in each case between the pressure chambers D1, D2 and the thrust bearing 9, whereby an application of pressure and a consequent stabilization of the rotatable shafts 10.1, 10.2 is always provided.

Grooves 5 are provided on the outer circumference of the fastening rings 8 to receive guide rings, which serve for support against the housing G and better load distribution. The piston 1 preferably comprises two halves, which are arranged in mirror image relation on opposite sides of a central axis A2 which extends orthogonally to the longitudinal axis A1. The two halves are radially welded to one another in the seal groove (weld seam V3), whereby their central mounting is assured by using a centering ring 12 (FIG. 1a). The pressure medium lines 2.1, 2.2, which extend radially through the housing G, are also secured to the housing G by welded joints V4.

The rotatable shafts 10.1, 10.2 and the housing covers GD are also preferably connected to the adjoining force-transmitting components by welding using a radial butt seam (V5).

Figure 5:
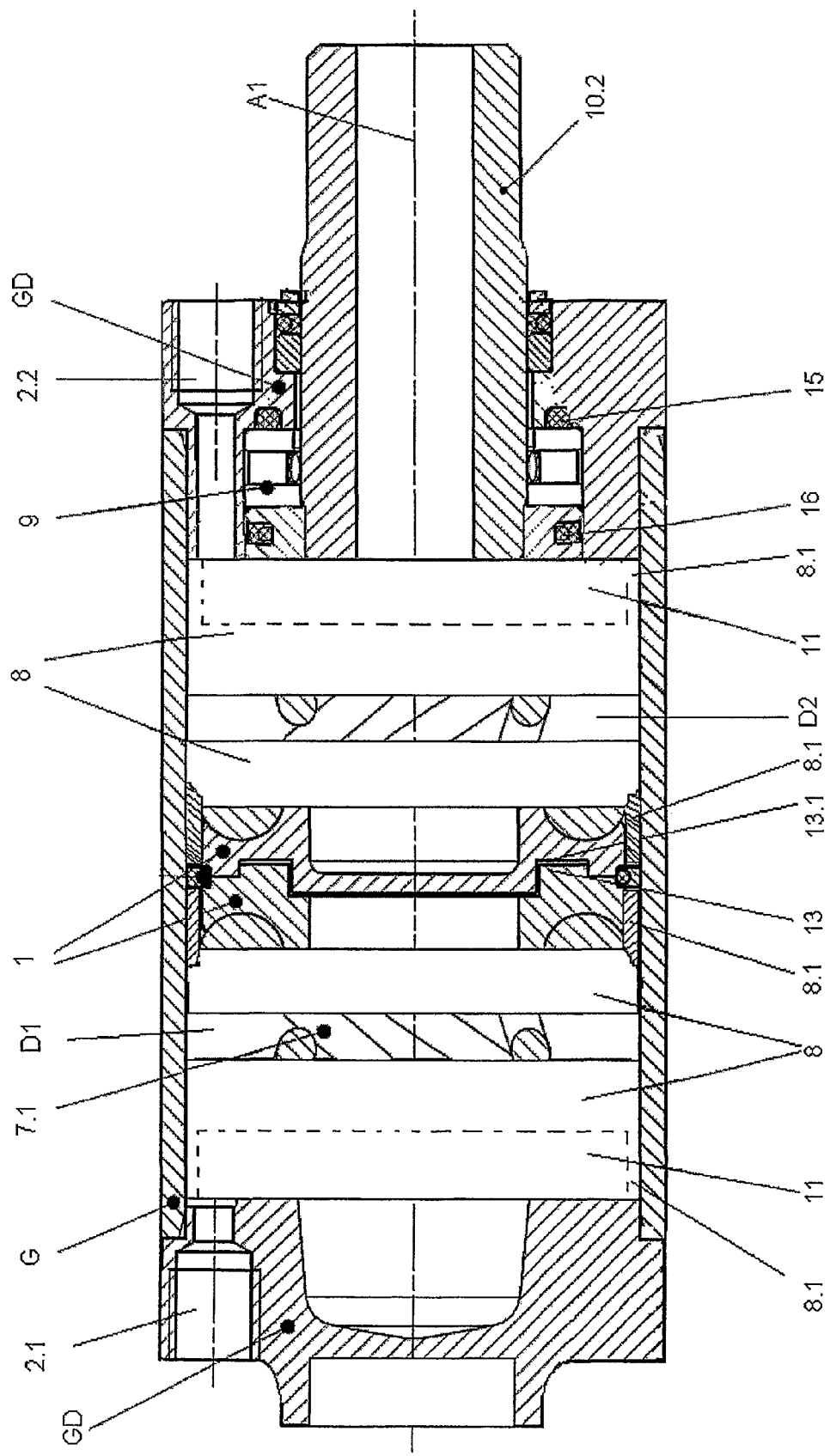
FIG. 5: shows the construction of a joint module S having an axial pressure medium feed and a rotatable shaft.

FIG. 5 shows an embodiment of the joint module which has an axial pressure medium feed. Although only the rotatable shaft 10.2 is shown here, the mirror-image configuration of the rotatable shafts 10.1 and 10.2 is to occur similarly to the illustrative embodiment described above. The first pressure medium feed 2.1 leads through one of the two housing covers GD, which are situated on both sides on the housing G, in the direction of the longitudinal axis A1 to the first pressure chamber D1, while the second pressure medium feed 2.2 leads through the other housing cover GD, also in the axial direction, to the second pressure chamber D2.

As a result of the space-saving configuration of this axial pressure medium feed, the installation space required by the joint module may be decreased further in comparison to the embodiment having a radial pressure medium feed.

Instead of the centering ring 12 used in FIG. 1a, another form of fixing the position of the two halves of the piston 1 is provided in the embodiment of FIG. 5. The one half of the piston 1 has a projection 13, which engages in a recess 13.1 of the adjoining half of the piston 1 to fix it in position.

Figure 6:
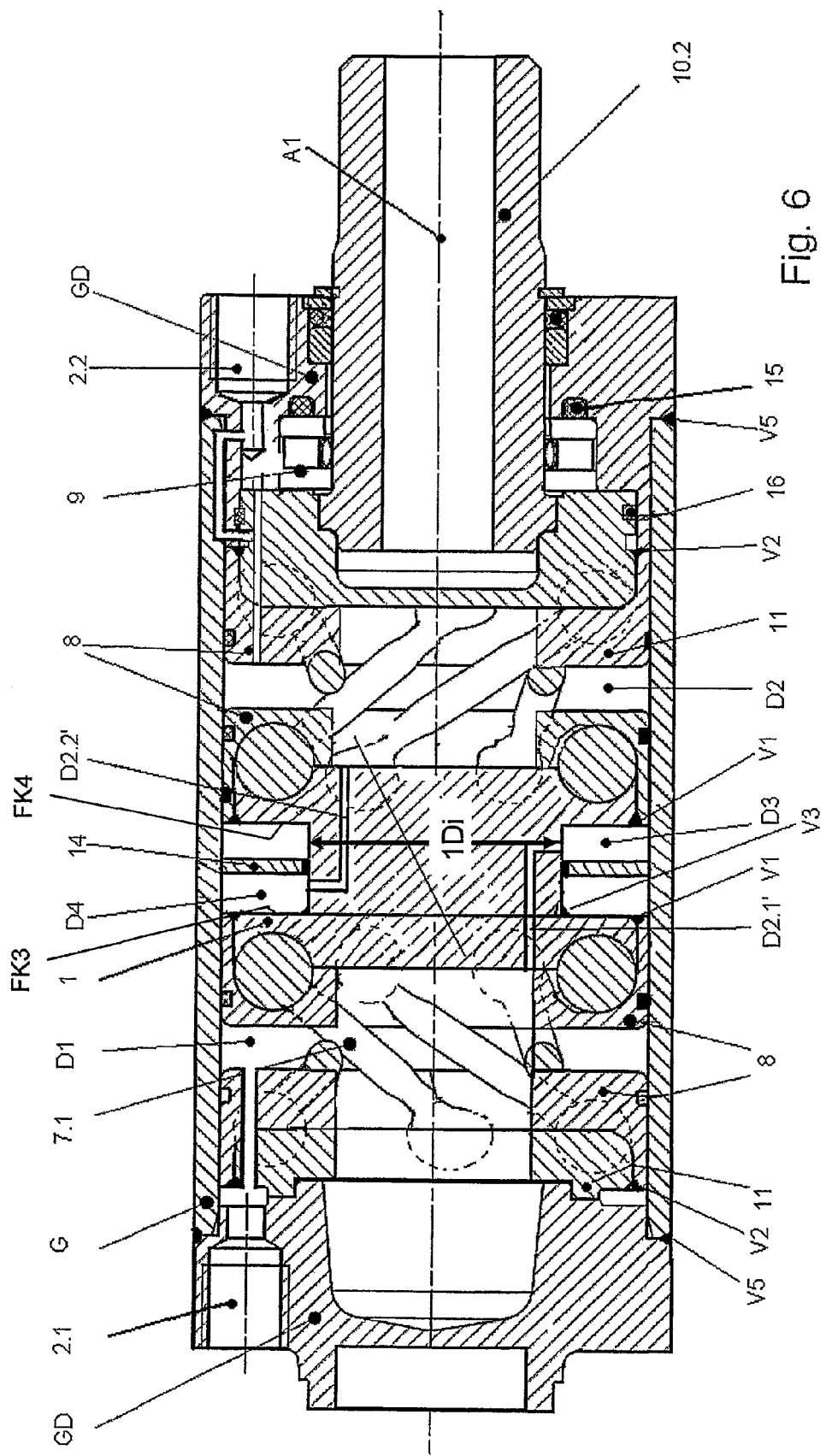
FIG. 6: shows a joint module S having an axial pressure medium feed, a rotatable shaft, and additional pressure chambers in the piston.

A further advantageous embodiment provides an additional pressure chamber D3 and an additional pressure chamber D4 in the piston 1 as shown in FIG. 6. The piston 1 is constructed as H-shaped viewed in longitudinal section, having a centrally reduced diameter −1 Di. An annular cavity, which is divided into two chambers by a partition wall 14, is thereby formed between the housing G and the middle part of the "H". The outer diameter of the partition wall 14, which also has an annular construction, is fastened to the housing G, and a sealing ring is provided at the inner diameter of the partition wall, through which partition wall 14 contacts the reduced diameter area −1 Di of the piston 1. A third piston surface FK3 is thus formed in the third pressure chamber D3, and a fourth piston surface FK4 is formed in the fourth pressure chamber D4 in the piston 1.

A first connection line 2.1', which originates from the pressure chamber D1, leads to the third pressure chamber D3, which is located on the opposite side of the partition wall 14, viewed in the direction of the longitudinal axis Al from the first pressure chamber D1. A second connection line 2.2' connects the second pressure chamber D2 to the fourth pressure chamber D4, which is located on the opposite side of the partition wall 14 viewed in the direction of the longitudinal axis Al from the pressure chamber D2.

The hydraulic working surface and thus the contact pressure may be increased by this configuration of the two additional pressure chambers D3 and D4. For example, if a pressure is built up in the first pressure chamber D1 via the pressure medium feed 2.1, the pressure medium also reaches the third pressure chamber D3 via the connection line 2.1'. A hydraulic working surface is thus provided, which is acted upon by the pressure which builds up in the pressure chambers D1 and D3. The pressure buildup in the pressure chambers D2 and D4 occurs in an analogous manner.

An O-ring 15 acts as an axial spring element for the thrust bearing 9 and serves to compensate for axial play as well as to avoid operating noises.

A seal 16, which is situated on the external diameter of the socket ring 11, absorbs the bending torque applied to the rotatable shafts 10.1, 10.2.

The joint module according to the invention constructed in this way is distinguished by a relatively high efficiency with a small construction volume. Due to the use of a piston 1 having a relatively thin piston base, elastic deformation and thus dissipation of tensions occurs. A balanced tension curve is thus ensured.

The weld seams V1 and V2, which are situated in the axial direction of the longitudinal axis A1 of the joint module, prevent jamming of the ball and socket-like connections and provide good tolerance compensation. In addition, the configuration of the coupling elements allows a balanced torque curve. Furthermore, by using two shaft outputs as shown in FIG. 1a, the joint module according to the invention may concurrently be constructed as a stabilizer support bearing.

Figure 7:
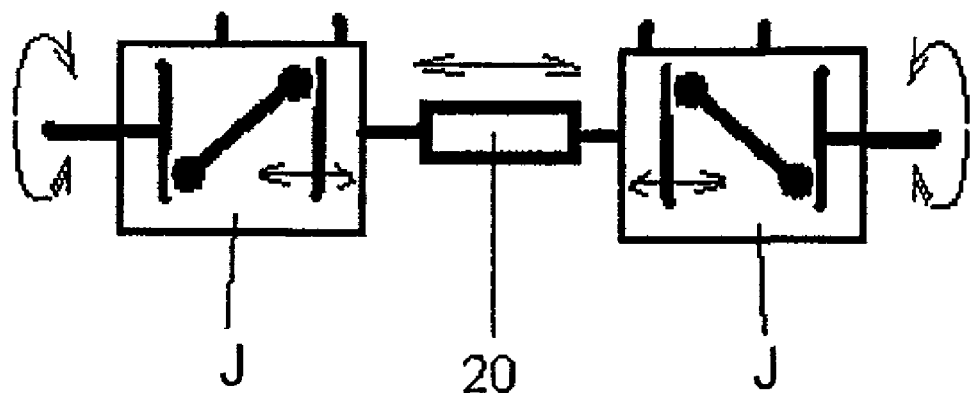
FIG. 7: shows an apparatus comprising two joint modules, which are situated so they are axially movable in relation to one another.

In accordance with FIG. 7, it is possible to produce an apparatus for the compensation and/or transmission of forces/torques and rotational movements between two components, in which two joint modules J are situated one behind another and are arranged so they are adjustable and/or movable relative to one another in the axial direction via an axial compensator 20. In this way additional axial movements may be compensated for or generated.

Figure 8:
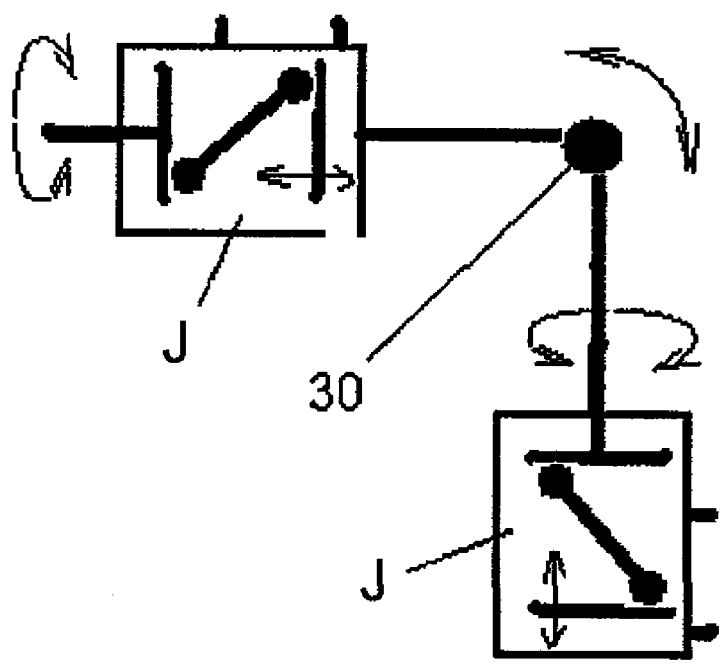
FIG. 8: shows an apparatus comprising two joint modules, which are situated offset in angle in relation to one another.

Furthermore, two joint modules J may be arranged offset at an angle of 90° to one another (FIG. 8) and be pivotable relative to one another via a joint 30, for example. It is thus possible to generate or compensate for movements in greatly varying directions.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the amended claims and equivalents thereof.

The invention claimed is:

1. An apparatus comprising a ball rod joint module for compensating or transmitting forces, torques or rotational movements between two components, said joint module comprising:
a piston,
at least one rotatable shaft,
a plurality of coupling rods having a ball at each end thereof interposed between said piston and said rotatable shaft so as to assume a spatial angle with a ball at one end of each coupling rod being connected in an articulated manner to the piston and the ball at the other end of each coupling rod being connected in an articulated manner to the rotatable shaft;
a pressure chamber adjacent said piston, and
pressure medium feed passage leading to said pressure chamber;
wherein;
application of a pressure medium through said pressure medium feed passage to said pressure chamber will cause movement of said piston, and the movement of said piston will impart a rotational movement to said rotatable shaft through said coupling rods;
the coupling rods having balls at each end are fixed at the end disposed toward the piston and at the end disposed toward the rotatable shaft by respective fastening rings, said fastening rings each comprising a base in which concavely curved recesses are situated to form ball sockets in which the balls at the ends of the coupling rods are received, and
i) each base has a central opening, from which radially outwardly extending slots lead to the concavely curved recesses, said slots having a width which is greater than the diameter of the rods which connect the balls of the coupling rods; or
ii) each recess is associated with an offset hole, which transitions into the recess and whose diameter is greater than the ball diameter.

2. An apparatus as claimed in claim 1, wherein said piston is locked against rotation, and a linear translational movement of said piston causes the spatial angle of the coupling rods to change and thereby imparts the rotational movement to said at least one rotatable shaft.

3. An apparatus as claimed in claim 1, wherein said piston is disposed between two rotatable shafts and is connected by first ones of said coupling rods to one of the rotatable shafts and by second ones of said coupling rods to the other of said rotatable shafts such that a linear translational movement of said piston will cause the two rotatable shafts to rotate in opposite rotational directions.

4. An apparatus as claimed in claim 1, wherein said joint module is interposed between two components of a vehicle chassis to compensate for movements in the vehicle chassis and stabilize the vehicle.

5. An apparatus as claimed in claim 1, wherein said piston, said at least one rotatable shaft, said coupling rods, and said pressure chamber are arranged in a common housing.

6. An apparatus as claimed in claim 1, wherein said apparatus comprises at least two of said joint modules coupled to one another.

7. An apparatus as claimed in claim 6, wherein said two ball rod joint modules are coupled so that they are moveable axially relative to each other or are pivotable relative to each other.

8. An apparatus as claimed in claim 1, wherein pressure chambers are situated on both sides of the piston in a housing, and a respective pressure medium feed passage extends axially through the housing to each of the pressure chambers.

9. An apparatus as claimed in claim 1, wherein the balls at the ends of the coupling rods are fixed by the respective fastening rings to the piston or to the rotatable shaft, each said fastening ring having openings through which the coupling rods extend, and each said fastening ring being secured respectively to the piston or to the rotatable shaft.

10. An apparatus as claimed in claim 9, wherein each said fastening ring is secured respectively to the piston or to the rotatable shaft by welding.

11. An apparatus as claimed in claim 9, wherein the ball sockets each have a diameter which is greater than the diameter of the balls fixed therein, and said ball sockets having a pole spacing equal to the diameter of the balls fixed therein.

12. An apparatus as claimed in claim 9, wherein one fastening ring is secured by a weld seam generated in the axial direction to the piston and another fastening ring is secured by a weld seam generated in the axial direction to a socket ring which in turn is attached to the rotatable shaft.

13. An apparatus as claimed in claim 12, wherein the fastening rings each have an edge which overlaps the piston or the socket ring in the axial direction, said weld seams are generated between the overlapping edge and the piston or the socket ring, respectively.

14. An apparatus as claimed in claim 1, comprising first and second pressure chambers on opposite sides of said piston, and further comprising a third pressure chamber connected to said first pressure chamber, and a fourth pressure chamber connected to said second pressure chamber.

15. An apparatus as claimed in claim 14, wherein said piston has a reduced diameter in a central area thereof, and forms third and fourth piston surfaces at axial ends of said reduced diameter area, and said third and the fourth pressure chambers are located in a cavity between the housing, the reduced diameter, and said third and fourth piston surfaces of the piston and are separated from one another by a partition wall extending from the housing to the reduced diameter area of the piston, said
third pressure chamber being located on the side of the partition wall remote from the first pressure chamber, and said fourth pressure chamber being located on the side of the partition wall remote from the second pressure chamber.

16. An apparatus as claimed in claim 15, wherein the outer diameter of said partition wall is attached to the housing and the inner diameter of said partition wall sealingly contacts the reduced diameter area of the piston to isolate the third and fourth pressure chambers from each other.

17. An apparatus as claimed in claim 1, wherein
said piston is mounted in a housing having a longitudinal axis so as to be both axially and rotationally movable;
a first pressure chamber to which a first pressure medium line leads, is situated between one side of said piston and a rotatable shaft, and
a second pressure chamber to which a second pressure medium line leads, is situated between an opposite side of the piston and either a second rotatable shaft or a housing end cover.

18. An apparatus as claimed in claim 17, wherein the first pressure medium line and the second pressure medium line each extend from respective housing end covers situated at opposite longitudinal ends of the housing in the direction of the longitudinal axis of said housing.

19. An apparatus as claimed in claim 17, wherein the first pressure medium line and the second pressure medium line each extend from respective connections attached to sides of said housing radially through the housing.

20. An apparatus as claimed in claim 17, wherein the balls at the ends of the coupling rods are fixed respectively by the respective fastening ring to the piston or to the rotatable shaft or to an end cover of a housing in ball sockets, each fastening ring having openings through which the coupling rods extend and radially extending slots connected to said openings for guiding the coupling rods to said openings, and each fastening ring being secured respectively to the piston or to the rotatable shaft or to the housing end cover.

21. An apparatus as claimed in claim 1, wherein said piston is disposed between first and second rotatable shafts and is connected by first ones of said coupling rods to the first rotatable shaft and by second ones of said coupling rods to the second rotatable shaft such that a linear translational movement of said piston will cause the first and second two rotatable shafts to rotate; the first rotatable shaft and the first ones of said coupling rods on one side of the piston being arranged in a mirror image relation to the second rotatable shaft and the second ones of said coupling rods on the other side of the piston relative to a central axis of the piston extending perpendicularly to the longitudinal axis of said first and second rotatable shafts.

22. An apparatus as claimed in claim 1, wherein said piston is disposed between first and second rotatable shafts and is connected by first ones of said coupling rods to the first rotatable shaft and by second ones of said coupling rods to the second rotatable shaft such that a linear translational movement of said piston will cause the first and second two rotatable shafts to rotate; and wherein the first ones of said coupling rods on one side of the piston are arranged offset around the circumference of the piston from the second ones of said coupling rods on the other side of the piston.

23. An apparatus as claimed in claim 1, wherein said piston is disposed between first and second rotatable shafts and is connected by first ones of said coupling rods to the first rotatable shaft and by second ones of said coupling rods to the second rotatable shaft such that an application of pressure to either of a first or second pressure chamber on opposites sides of said piston will induce a linear translational movement of said piston and cause the first and second two rotatable shafts to rotate; and wherein if said first and second the pressure chambers are both relieved of pressure, said first and second rotatable shafts are decoupled and independently rotatable, and if pressure is applied to both first and second pressure chambers, said first and second rotatable shafts are rigidly coupled to one another.

24. An apparatus as claimed in claim 1, wherein each rotatable shaft is supported by an axial thrust bearing on a respective end cover of a housing.

25. An apparatus as claimed in claim 1, wherein the piston is divided into two halves perpendicularly to the longitudinal axis of the at least one rotatable shaft, and the two halves of the piston are centered relative to each other by a centering ring.

26. An apparatus as claimed in claim 1, wherein the piston is divided into two halves perpendicularly to the longitudinal axis of the at least one rotatable shaft, and the two halves of the piston are centered relative to each other by a projection on one of the piston engages in a recess on the other half of the piston.

27. An apparatus as claimed in claim 1, wherein the piston is divided into two halves perpendicularly to the longitudinal axis of the at least one rotatable shaft, and the two halves of the piston are welded to each other.

28. An apparatus as claimed in claim 1, wherein the balls at the other end of each coupling rod are connected to said rotatable shaft through an adapter.

* * * * *